(12) United States Patent  
Guo et al.

(10) Patent No.: US 8,817,199 B2  
(45) Date of Patent: *Aug. 26, 2014

(54) TWISTED NEMATIC (TN) BASED 3D DISPLAY SYSTEM AND METHOD (75) Inventors: Fuzhong Guo, Shenzhen (CN); Zhang Ge, Shenzhen (CN); Lei Song, Shenzhen (CN)

(73) Assignee: Superd Co. Ltd., Shenzhen (CN)

( * ) Notice: Subject to any disclaimer, the term of this patent is extended or adjusted under 35 U.S.C. 154(b) by 160 days.

This patent is subject to a terminal disclaimer.

(21) Appl. No.: 13/597,343

(22) Filed: Aug. 29, 2012

(65) Prior Publication Data

US 2012/0320292 A1 Dec. 20, 2012

Related U.S. Application Data (63) Continuation-in-part of application No. 12/906,250, filed on Oct. 18, 2010, now Pat. No. 8,279,363.

(51) Int. Cl.
*G02F 1/1335* (2006.01)
*G02F 1/13* (2006.01)
*G09G 3/36* (2006.01)
*G02F 1/139* (2006.01)
*G02F 1/1362* (2006.01)
*G02B 27/26* (2006.01)
*G09G 3/20* (2006.01)
*G09G 3/00* (2006.01)
*G02F 1/1343* (2006.01)

(52) U.S. Cl.
CPC .......... *G09G 3/20* (2013.01); *G09G 2300/0482* (2013.01); *G09G 3/3622* (2013.01); *G02F 1/1396* (2013.01); *G09G 3/3648* (2013.01); *G02F 1/134309* (2013.01); *G02F 1/1362* (2013.01); *G02F 1/133526* (2013.01); *G09G 2300/023* (2013.01); *G02B 27/26* (2013.01); *G09G 3/003* (2013.01)
USPC ................ 349/15; 349/99; 349/101; 349/194

(58) Field of Classification Search
CPC .. G02B 17/2214; G02B 27/26; G02B 5/3016; G02F 1/13363; G02F 1/1396; G02F 1/1397; G02F 1/133528; G02F 2001/133531; G02F 2001/133543; G02F 2413/08; H04N 13/0404
USPC ....................................... 349/15, 99, 101, 194
See application file for complete search history.

(56) References Cited

U.S. PATENT DOCUMENTS 8,279,363 B2 * 10/2012 Ge et al. ........................ 349/15
2012/0169648 A1 * 7/2012 Luo ............................. 345/174

* cited by examiner

Primary Examiner — Mike Qi
(74) Attorney, Agent, or Firm — Anova Law Group, PLLC (57) ABSTRACT A 3D display apparatus includes a display device, a liquid crystal panel, and a lens unit. The display device is configured to output polarized lights of one or more images with a first polarization direction. The liquid crystal panel is coupled to the display device and contains a plurality of pixel display areas to receive the polarized lights. The display areas can be individually controlled by corresponding active switches to a first state in which the first polarization direction is transformed into a second polarization direction or a second state in which the first polarization direction is maintained. Further, the lens unit is coupled to the liquid crystal panel and is configured to guide the polarized lights with the second polarization direction to pass through for 2D display and to guide polarized lights with the first polarization direction into predetermined transmitting directions for 3D display.

18 Claims, 6 Drawing Sheets

TWISTED NEMATIC (TN) BASED 3D DISPLAY SYSTEM AND METHOD

CROSS-REFERENCES TO RELATED APPLICATIONS

This application is a continuation-in-part of U.S. patent application Ser. No. 12/906,250, filed on Oct. 18, 2010, which claims the priority of PCT patent application no. PCT/CN2010/070290 filed on Jan. 20, 2010, the entire contents of all of which are incorporated herein by reference.

FIELD OF THE INVENTION

The present invention generally relates to twisted nematic (TN) display technologies and, more particularly, to the methods and systems for three dimensional (3D) display based on TN liquid crystal panels.

BACKGROUND

Figure 1:
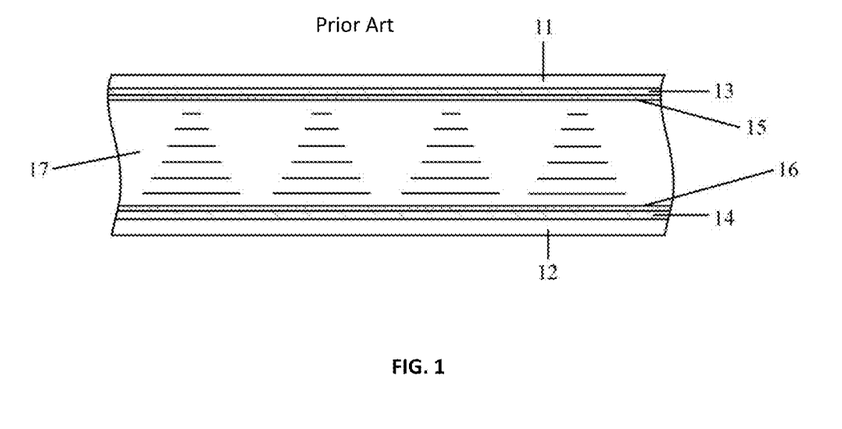
FIG. 1 illustrates a conventional TN cell.

Nowadays, twisted nematic (TN) LC Panel (or TN LC cell) is being widely used in various fields, especially in display technologies. FIG. 1 illustrates a conventional TN LC panel. Glass substrate 11 and glass substrate 12 are arranged in parallel with a predetermined distance therebetween. On the inner surfaces of substrate 11 and substrate 12, transparent electrodes 13 and 14 are provided respectively. Further, on the outer surfaces of the electrodes 13 and 14, alignment layers 15 and 16 are provided respectively, and the rubbing directions of alignment layers 15 and 16 are perpendicular to each other. TN liquid crystal is filled between alignment layers 15 and 16.

When there is no voltage applied between the transparent electrodes 13 and 14, linearly polarized lights entering the TN LC panel via an alignment layer in a direction parallel to the rubbing direction of the alignment layer, the TN LC panel will change the polarization direction of the lights by 90 degrees coming out of the TN LC panel. However, when a voltage applied between the transparent electrodes 13 and 14 is greater than or equal to a threshold voltage, TN molecules re-align the long axis along the direction of the electric field between transparent electrodes 13 and 14, and the TN LC panel does not change the polarization of the entering lights.

Further, conventional 2D/3D switchable display systems, such as one disclosed in Chinese patent application no. CN101387758A, often position an above-mentioned TN LC panel in front of a regular display screen as the 2D/3D switching device. The 2D/3D display is switched by regulating polarization directions of lights passing the TN LC panel through controlling voltages applied to the TN LC panel. Thus, the 2D/3D display switching is often done for the entire display screen and not for different portions of the display screen.

To solve the above problem, other conventional 2D/3D switchable display systems use a thin film transistor (TFT) TN LCD panel as the switching means. Because, in the TFT TN LCD panel, pixels can be individually addressed, 2D/3D switching can be realized on portions of the display screen. However, TFT TN LCD panels are complex and expensive, and often need to place non-transparent TFT circuit wires and grating wires, etc., on the substrates, which may need to be covered by a black matrix. Thus, an effective display area may be reduced, the aperture ratio may be reduced, and the existence of the black matrix may impact image display quality.

However, if removing the black matrix, bright lines may appear along the electrodes, which may also impact image display quality.

The disclosed methods and systems are directed to solve one or more problems set forth above and other problems.

BRIEF SUMMARY OF THE DISCLOSURE

One aspect of the present disclosure includes a three-dimensional (3D) display apparatus. The 3D display apparatus includes a display device, a liquid crystal panel, and a lens unit. The display device is configured to output polarized lights of one or more images with a first polarization direction. The liquid crystal panel is coupled to the display device and contains a plurality of pixel display areas to receive the polarized lights from the display device with the first polarization direction. The display areas are capable of being individually controlled by corresponding active switches to be in a first state in which the first polarization direction is transformed into a second polarization direction different from the first polarization direction or to be in a second state in which the first polarization direction is maintained. Further, the lens unit is coupled to the liquid crystal panel and is configured to guide the polarized lights with the second polarization direction to pass through for 2D display and to guide polarized lights with the first polarization direction into predetermined transmitting directions for 3D display.

Another aspect of the present disclosure includes a liquid crystal panel. The liquid crystal panel includes a first control layer, a second control layer, and a liquid crystal layer arranged between the first control layer and the second control layer. The first control layer includes a first substrate, a first electrode lead array, an electrode cell array containing a plurality of electrode cells, a plurality of active switches, and a first alignment layer. The second control layer includes a second substrate, a second electrode, and a second alignment layer. Further, a plurality of pixel display areas are formed based on the plurality of electrode cells to receive polarized lights of one or more images with a first polarization direction and are capable of being individually controlled by the plurality of active switches to be in a first state in which the first polarization direction is transformed into a second polarization direction different from the first polarization direction or to be in a second state in which the first polarization direction is maintained.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 6:
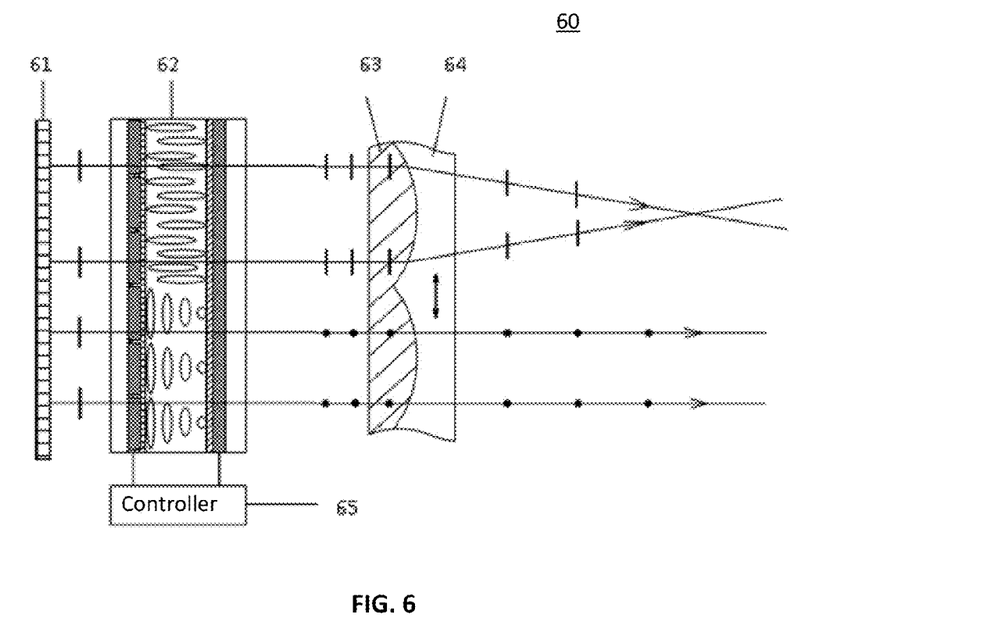
FIG. 6 illustrates an exemplary 3D display system consistent with the disclosed embodiments.

FIG. 6 shows a structural diagram of an exemplary 3D display system 60. As showed in FIG. 6, 3D display system 60 includes a display device 61, a twisted nematic (TN) liquid crystal panel (TN panel) 62, a first lens array 63, a second lens array 64, and a controller 65. Other components may be added and certain devices may be removed without departing from the principles of the disclosed embodiments. Further, space between various components is shown for illustrative purposes, the disclosed embodiments may or may not have such space.

3D display system 60 may be used to display three-dimensional (3D) images. Display device 61 may be provided with sets of images to be viewed by a viewer's left eye and right eye separately. Each set of images are from a different viewpoint. For example, a stereo (two viewpoints) 3D image may include an image set for a viewer's left eye (i.e., a left image) and a corresponding image set for the viewer's right eye (i.e., a right image), with a certain parallax between the left image and the right image. Various viewpoints may also be used.

3D display system 60 may also display full-resolution two-dimensional (2D) images, and may switch between 2D display and 3D display dynamically. Further, 3D display system 60 may also have 2D display and 3D display on a same display screen at the same time. For example, when multiple display windows are opened on display device 61, certain display window or windows may display 3D images, while certain display windows may display 2D images, and each display window may switch 2D display to 3D display or vice versa dynamically.

Display device 61 may include any appropriate device for displaying images, such as a plasma display panel (PDP) display, a cathode ray tube (CRT) display, a liquid crystal display (LCD), an organic light emitting diode (OLED) display, and other types of displays. Display device 61 may be used in computers, consumer electronics, medical equipment, professional equipment, or other systems requiring information display. Optionally, a polarizer sheet may be positioned over display device 61 to make lights from display device 61 linearly polarized before entering TN panel 62.

Figure 7:
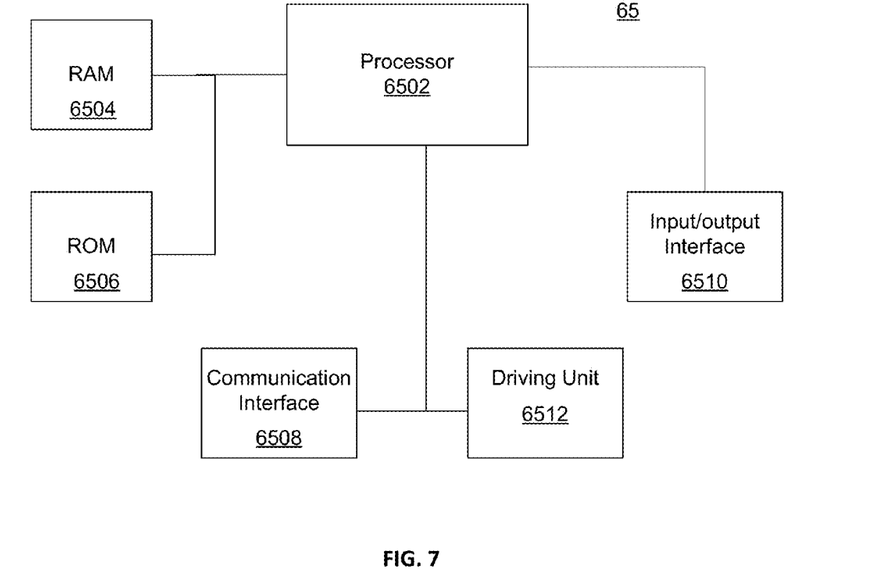
FIG. 7 illustrates a block diagram of an exemplary controller consistent with the disclosed embodiments.

Controller 65 may include any appropriate device for providing control and other functionalities to 3D display system 60. FIG. 7 shows an exemplary block diagram of controller 65. As shown in FIG. 7, controller 65 may include a processor 6502, a random access memory (RAM) unit 6504, a read-only memory (ROM) unit 6506, a communication interface 6508, an input/output interface unit 6510, and a driving unit 6512. Other components may be added and certain devices may be removed without departing from the principles of the disclosed embodiments.

Processor 6502 may include any appropriate type of graphic processing unit (GPU), general-purpose micropro-cessor, digital signal processor (DSP) or microcontroller, and application specific integrated circuit (ASIC), etc. Processor 6502 may execute sequences of computer program instructions to perform various processes associated with display system 60. The computer program instructions may be loaded into RAM 6504 for execution by processor 6502 from read-only memory 6506.

Communication interface 6508 may provide communication connections such that display system 60 may be accessed remotely and/or communicate with other systems through computer networks or other communication networks via various communication protocols, such as transmission control protocol/internet protocol (TCP/IP), hyper text transfer protocol (HTTP), etc.

Input/output interface 6510 may be provided for users to input information into display system 60 or for the users to receive information from display system 60. For example, input/output interface 6510 may include any appropriate input device, such as a remote control, a keyboard, a mouse, an electronic tablet, voice communication devices, or any other optical or wireless input devices. Further, driving unit 6512 may include any appropriate driving circuitry to drive various devices, such as TN panel 62 and/or display device 61.

Figure 2:
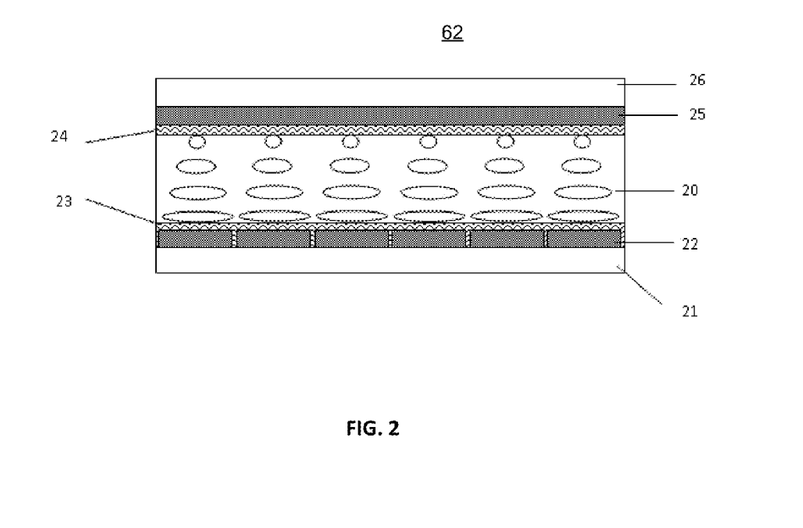
FIG. 2 illustrates a diagram of an exemplary TN panel consistent with the disclosed embodiments.

Returning to FIG. 6, TN panel 62 may include any appropriate device coupled with display device 61 to provide 3D display. FIG. 2 illustrates a diagram of an exemplary TN panel 62. As showed in FIG. 2, TN panel 62 includes a first substrate 21, a first electrode 22, a first alignment layer 23, a second alignment layer 24, a second electrode 25, a second substrate 26, and TN liquid crystal 20. Other components may also be included.

First substrate 21, first electrode 22, and first alignment layer 23 may form a first control layer, while second alignment layer 24, second electrode 25, and second substrate 26 may form a second control layer. TN liquid crystal 20 may be sealed in the space between the first control layer and the second control layer by sealing edges of the first control layer and the second control layer using, for example, special glues. As used here, an electrode may refer to an electrode section including a plurality of electrodes or an individual electrode according to the context of the disclosure.

Figure 3:
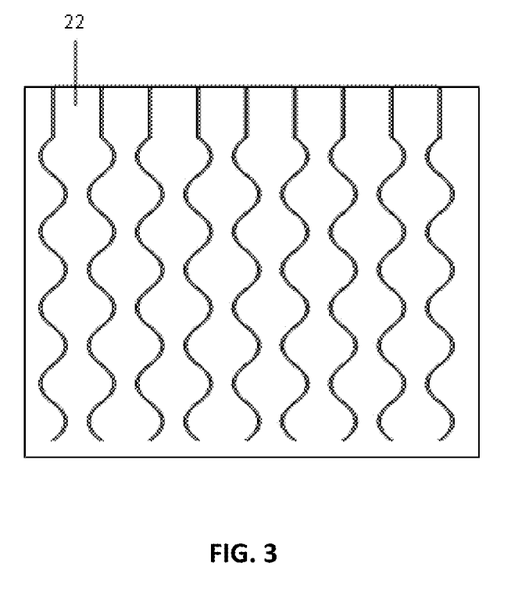
FIG. 3 illustrates an exemplary electrode section consistent with the disclosed embodiments.

In the first control layer, first substrate 21, first electrode 22, and first alignment layer 23 may be made of any appropriate transparent materials. First electrode 22 may include a plurality of electrodes arranged in a certain pattern. The plurality of electrodes may also be in any appropriate shape such that a large area of substrate may be covered by the plurality of electrodes. For example, the plurality of electrodes of first electrode 22 may be in a sinusoid shape, a wave shape, a curve shape, and a zigzag shape, etc. In certain embodiments, the plurality of electrodes of first electrode 22 may be in one or more shape selected from a wave shape, a curve shape, and a zigzag shape. As shown in FIG. 3, a plurality of sinusoid-shaped electrodes of first electrode 22 may be used. Each of sinusoid-shaped strip electrodes may be arranged horizontally in parallel and separated by a certain predetermined distance. Other shapes or arrangements may also be used.

The plurality of first electrodes 22 may be arranged or built on the surface of first substrate 21. First alignment layer 23 is arranged on top of the plurality of first electrodes 22. For example, first alignment layer 23 may be formed by applying an alignment agent on the top of first electrodes 22 and first substrate 21.

Figure 4:
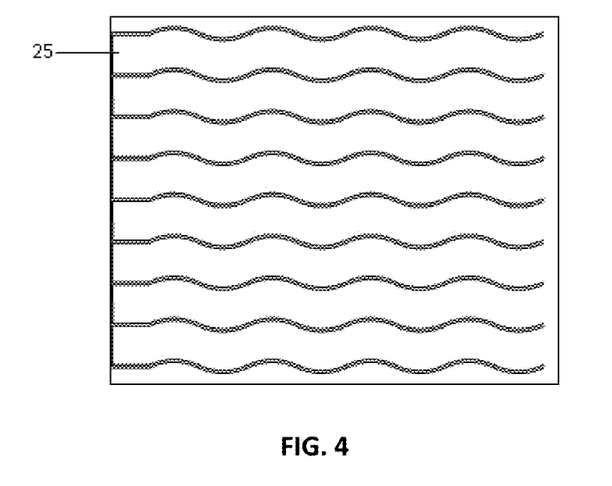
FIG. 4 illustrates an exemplary electrode section consistent with the disclosed embodiments.

Further, in the second control layer, second alignment layer 24, second electrode 25, and second substrate 26 may also be made of any appropriate transparent materials. Similar to the first control layer, as shown in FIG. 4, second electrode 25 may also include a plurality of sinusoid-shaped strip electrodes. The plurality of electrodes of second electrode 25 may also be in a wave shape, a curve shape, and a zigzag shape, etc., or any appropriate shape such that a large area of substrate may be covered by the plurality of electrodes of second electrode 25. For example, the plurality of electrodes of first electrode 22 may be in one or more shape selected from a wave shape, a curve shape, and a zigzag shape. Each of sinusoid-shaped strip electrodes may be arranged vertically in parallel and separated by a certain predetermined distance. That is, the plurality of second electrodes 25 may be arranged in a right angle or any appropriate angle with respect to the plurality of first electrodes 22. Other shapes or arrangements may also be used.

The plurality of second electrodes 25 may be arranged or built on the surface of second substrate 26. Second alignment layer 24 is arranged on top of the plurality of second electrodes 25 with a flat surface. Further, TN liquid crystal layer 20 may be placed between first alignment layer 23 and second alignment layer 24.

Figure 5:
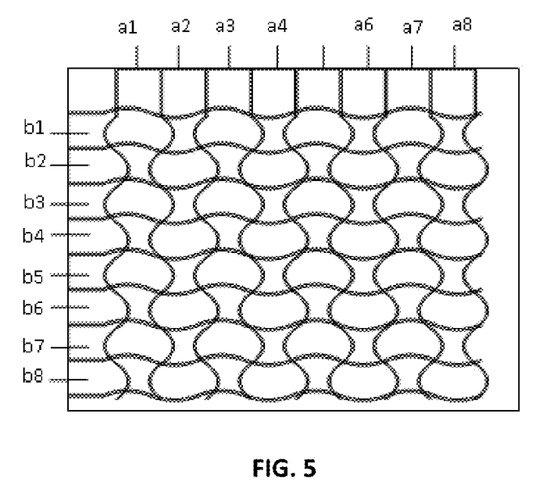
FIG. 5 illustrates an exemplary configuration of a TN panel consistent with the disclosed embodiments.

Thus, the first control layer and the second control layer are arranged in parallel. Further, certain liner materials, e.g. a sealant, may be placed between first alignment layer 23 and second alignment layer 24 to keep the distance between the first control layer and the second control layer, or between first alignment layer 23 and second alignment layer 24, being a predetermined distance. FIG. 5 shows an exemplary configuration of TN panel 62. Although only eight first electrodes a1 to a8 and eight second electrodes b1 to b8 are shown for illustrative purposes, any number of electrodes may be used.

As shown in FIG. 5, the horizontally-arranged plurality of first electrodes 22 and vertically-arranged plurality of second electrodes 25 may overlap each other such that an 8×8 pixel display areas can be formed. That is, the pixel display areas are defined by a1, a2, a3, a4, a5, a6, a7, and a8 in horizontal direction and b1, b2, b3, b4, b5, b6, b7, and b8 in vertical direction. Each display area includes portions of various layers, such as the second control layer, the first control layer, and the TN liquid crystal layer 20 determined by a first electrode and a second electrode. For illustrative purposes, the 8×8 pixel display areas may be represented by an 8×8 two dimensional pixel matrix.

A column of the pixel matrix represents first electrode 22 and a row of the pixel matrix represents second electrode 25. Thus, a pixel display area $a_{ij}$ may represent a pixel display area defined by i-th row and j-th column, wherein i is from 1, 2, 3, . . . , 8, and j is also from 1, 2, 3, . . . , 8.

When no voltage is applied to electrodes of the pixel display area $a_{ij}$, under the effects of first alignment layer 23 and second alignment layer 24, TN liquid crystal 20 in $a_{ij}$ is twisted by 90 degrees. When lights enter TN panel 62 with a polarization direction parallel to the rubbing direction of the entering alignment layer and pass through TN panel 62, the polarization direction of the lights is rotated in 90 degrees when coming out TN panel 62. This state of TN liquid crystal 20 may be referred as a first state.

On the other hand, when a voltage applied between the electrodes of the pixel display area $a_{ij}$, for example, by applying to the i-th electrode and the j-th electrode separate voltages $U_i$ and $U_j$, respectively, and the difference between $U_i$ and $U_j$ is greater than or equal to a threshold voltage, TN liquid crystal 20 may be in an electric field formed between the i-th electrode and the j-th electrode. TN liquid crystal molecules may re-align the long axis along the direction of the electric field between the i-th electrode and the j-th electrode, i.e., along a direction perpendicular to the direction from first substrate 21 to second substrate 26. Thus, display area $a_{ij}$ does not change the polarization direction of the entering lights. This state of TN liquid crystal 20 may be referred as a second state. Therefore, by applying different voltages to different columns and rows, different pixel display areas can be controlled separately in a different state.

That is, certain pixel display areas may be controlled to be in one of the first state and the second state, while certain other pixel display areas may be controlled to be in the other one of the first state and the second state. In certain embodiments, a row (vertical) scanning mechanism or a column (horizontal) scanning mechanism may be used to control switching between the states of TN liquid crystal 20. Further, the scanning frequency may be chosen such that the TN liquid crystal switches from the first state to the second state in a short time, while remaining in or around the second state for a time period equal to or greater than the period of the scanning frequency. Thus, when scanning the last row of TN panel 62, the first row that is already switched from the first state to the second state can still remain in the second state and does not return to the first state.

For example, in FIG. 5, at the beginning, a same voltage $U_0$ may be applied to electrodes a1 to a8 (i.e., first electrodes 22). To perform the row scanning process, starting with b1, each row from b1 to b8 is scanned and applied to a voltage $U_1$. When scanning a particular row, for example, the $5^{th}$ row (i.e., b5), a pulse voltage $U_2$ may be applied to electrodes a3, a4, a5, a6, and a7, such that the voltage difference between these electrodes and electrode b5, $U_2-U_1$, is greater than or equal to $U_{th}$, where $U_{th}$ is the threshold voltage for TN liquid crystal 20 to change state, $(U_1-U_0)$ is less than $U_{th}$ and $(U_2-U_0)$ is also less than $U_{th}$. Thus, TN liquid crystal 20 in pixel display areas $a_{53}$, $a_{54}$, $a_{55}$, $a_{56}$, and $a_{57}$ change state from the first state to the second state at about the same time.

Similarly, when scanning the $6^{th}$ row, a pulse voltage $U_2$ may be applied to electrodes a3, a4, a5, a6, and a7, such that the voltage difference between these electrodes and electrode b6, i.e., $(U_2-U_1)$, is greater than or equal to $U_{th}$, and TN liquid crystal 20 in pixel display areas $a_{63}$, $a_{64}$, $a_{65}$, $a_{66}$, and $a_{67}$ change state from the first state to the second state at about the same time. When scanning the $7^{th}$ row, a pulse voltage $U_2$ may be applied to electrodes a3, a4, a5, a6, and a7, such that the voltage difference between these electrodes and electrode b7, i.e., $U_2-U_1$, is greater than or equal to $U_{th}$, and TN liquid crystal 20 in pixel display areas $a_{73}$, $a_{74}$, $a_{75}$, $a_{76}$, and $a_{77}$ change state from the first state to the second state at about the same time.

Further, when scanning the $8^{th}$ row, a pulse voltage $U_2$ may be applied to electrodes a3, a4, a5, a6, and a7, such that the voltage difference between these electrodes and electrode b8, i.e., $U_2-U_1$, is greater than or equal to $U_{th}$, and TN liquid crystal 20 in pixel display areas $a_{s3}$, $a_{84}$, $a_{85}$, $a_{86}$, and $a_{87}$ change state from the first state to the second state at about the same time. In addition, because of a high scanning frequency, when scanning the $8^{th}$ row, TN liquid crystal 20 in pixel display areas $a_{53}$, $a_{54}$, $a_{55}$, $a_{56}$, $a_{57}$, $a_{63}$, $a_{64}$, $a_{65}$, $a_{66}$, $a_{67}$, $a_{73}$, $a_{74}$, $a_{75}$, $a_{76}$, and $a_{77}$ are still in the second state, while TN liquid crystal 20 in other pixel display areas is in the first state.

Thus, the above example illustrates that pixel display areas of rows 5, 6, 7, and 8 and columns 3, 4, 5, 6, and 7 are controlled in the second state while other pixel display areas are in the first state. That is, with the disclosed methods and systems, individual pixel display areas may be controlled separately. In addition, if there is a need to reverse the state of TN liquid crystal 20 in a pixel display area $a_{ij}$, a pulse voltage may be applied to j-th column during scanning the i-th row such that TN liquid crystal 20 in $a_{ij}$ can reverse its long axis and change back to the first state. A similar column scanning mechanism may also be used.

Returning to FIG. 6, first lens array 63 may include any appropriate single refraction lens arranged in an array configuration, and second lens array 64 may include any appropriate double refraction lens arranged in an array configuration. Further, first lens array 63 may be coupled closely with second lens array 64 to act as certain convex lenses when directing linearly polarized light from display device 61 and TN panel 62.

For illustrative purpose, polarized lights outputted from display device 61 are referred as first polarized lights with a particular polarization direction. If the polarization direction is changed by TN panel 62, the polarized lights outputted from TN panel 62 are referred as second polarized lights with a different polarization direction. Otherwise, TN panel 62 merely passes the first polarized lights. That is, if TN panel 62 does not change the polarization direction of the first polarized lights, no second polarized lights may exist. Further, first alignment layer 23 (i.e., the one close to display device 61) may have the same alignment direction as the first polarized lights, which may be realized by a sheet polarizer over display device 61.

As shown in FIG. 6, first lens array 63 may have a light incident surface which is plane, and a plurality of elongate semi-cylindrical convex surfaces. First lens array 63 may be made of optically isotropic materials with a single refractive index of $n_1$.

The second lens array 64 may have a light output surface which is plane and a plurality of elongate semi-cylindrical concave light incident surfaces. Each concave lens may be coupled to corresponding convex lens from first lens array 63, which may make the two lens arrays a tight-fit, coupled, and double flat surface unit. Other configurations may also be used. Further, second lens array 64 may be made of optically anisotropic materials.

Optically anisotropic material may be birefringent or double refraction, meaning the optically anisotropic material has two different refractive indices, an ordinary refractive index $n_o$ and an extraordinary refractive index $n_e$. Lights with a polarization direction perpendicular to the lens' optical axis have the refractive index of $n_o$; while lights with a polarization direction parallel to the lens' optical axis have a refractive index of $n_e$. The optical axis of second lens array 64 is shown in FIG. 6 as a double arrow, parallel to the polarization direction of the first polarized lights from display device 61. Further, $n_1=n_o$, and $n_o>n_e$. That is, when first lens array 63 is a convex lens array, the refractive index of the first lens array is equal to a larger one of an ordinary refractive index and an extraordinary refractive index of second lens array 64.

During operation, 3D display system 60 may have both 3D and 2D display on different portions of display screen. For example, as shown in FIG. 6, the upper two rays represent lights for 3D display, and the lower two rays represent lights for 2D display.

For 3D display, controller 65 may control TN panel 62 such that pixel display areas corresponding to the lights for 3D display are in the second state. That is, the first polarized lights of pixels outputted from display device 61 pass through TN panel 62 without change in polarization direction. The first polarized lights then pass first lens array 63 and enter second lens array 64. Because the optical axis of second lens array 64 is parallel to the polarization direction of the first polarized lights, second lens array 64 has a refractive index of $n_e$, $n_1>n_e$. Thus, this difference between the refractive indices, an optical step, makes lights at the interface between the convex surface of first lens array 63 and the concave surface of second lens array 64 converging. The coupled lens array thus acts as a convex lens and directs the first polarized lights (e.g., lights from a right image and a left image) to a viewer's right eye and left eye respectively to realize 3D display.

On the other hand, for 2D display, controller 65 may control TN panel 62 such that pixel display areas corresponding to the lights for 2D display are in the first state. The first polarized lights may enter TN panel 62 and the polarization direction of the first polarized lights may be changed by TN panel 62 in, for example, 90 degrees. Thus, the second polarized lights are outputted from TN panel 62. Because the polarization direction of the second polarized lights is now perpendicular to the optical axis of second lens array 64, second lens array 64 has a refractive index of $n_0$, and $n_1=n_o$. Thus, no optical step exists at the interface between convex surface of first lens array 63 and the concave surface of second lens array 64. The second polarized lights therefore go straight through the coupled lens array to the viewer's both eyes without separation to realize 2D display.

In addition, first lens array 63 and second lens array 64 can be designed differently from the ones shown in FIG. 6. For example, first lens array 63 can include concave lens of optically isotropic materials and second lens array 64 can include convex lens of optically anisotropic material with $n_1=\min(n_o, n_e)$. That is, when first lens array 63 is a concave lens array, the refractive index of the first lens array is equal to a smaller one of an ordinary refractive index and an extraordinary refractive index of second lens array 64. Other types of designs or configurations may also be used.

Figure 8:
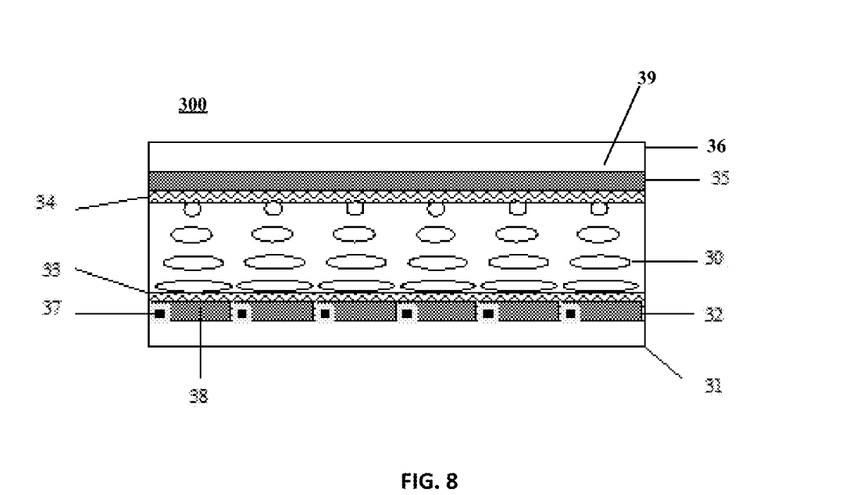
FIG. 8 illustrates another exemplary TN panel consistent with the disclosed embodiments.

FIG. 8 illustrates another exemplary TN panel 300 consistent with the disclosed embodiments. As shown in FIG. 8, TN panel 300 includes a first control layer 32, active switches 37 in the first control layer 32, a second control layer 39, and TN liquid crystal 30 placed between the first control layer 32 and the second control layer 39. TN liquid crystal 30 may be sealed in the space between the first control layer 32 and the second control layer 39 by sealing edges of the first control layer 32 and the second control layer 39 using, for example, special glues.

Figure 9:
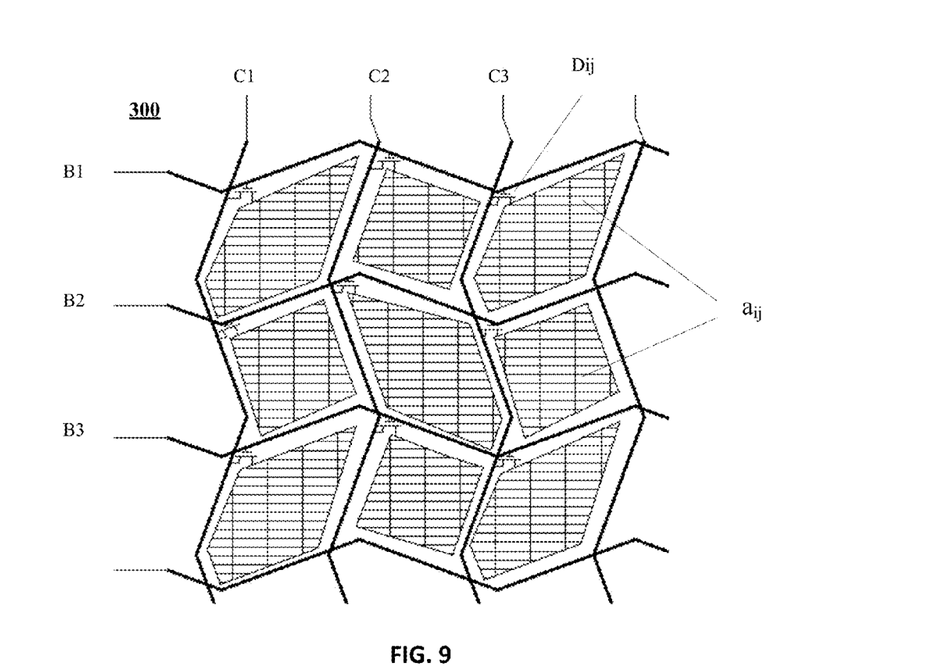
FIG. 9 illustrates an exemplary configuration of a TN panel consistent with the disclosed embodiments.

The first control layer 32 may include a first transparent substrate 31, a first electrode lead array, the active switches 37, a first electrode cell array 38, and a first alignment layer 33. The second control layer 39 may include a second transparent substrate 36, a second electrode 35, and a second alignment layer 34. Certain components may be omitted and other components may be added. FIG. 9 shows a top view of a TN panel 30.

As shown in FIG. 8 and FIG. 9, the array of first electrode leads include horizontal electrode leads and vertical electrode leads arranged in an array fashion, and the horizontal electrode leads and the vertical electrode leads are insulated by an insulating layer (not shown). The first electrode leads may be made of any appropriate transparent or non-transparent material, and the first alignment layer 33 is transparent. The first electrode cells 38 are placed between the transparent substrate 31 and the liquid crystal 30 such that each electrode cell, together with the second electrode 35, controls the liquid crystal above the electrode cell. Thus, each electrode cell controls a display area, which may include one or more pixels.

In certain embodiments, the first electrode leads (i.e., the horizontal electrode leads and the vertical electrode leads) may be in a curve shape (or a zig-zag curve shape), and the first electrode cells 38 may be formed according to the shape defined by the intersections of the horizontal electrode leads and vertical electrode leads. In certain other embodiments, the first electrode cells 38 may be formed first and the first electrode leads are routed according to the shapes of the first electrode cells 38 (e.g., around boundary lines of the first electrode cells).

Further, active switches 37 may include any appropriate active switches such as thin film transistor (TFT) semiconductor switching devices and other similar switching devices. The first electrode lead array and the first electrode cell array 38 are insulated from each other and placed on the first transparent substrate 31. The first alignment layer 33 is formed in the space between the first electrode lead array and the first electrode cell array 38 and on the top surface of the first electrode lead array and the first electrode cell array 38 with a flat alignment layer top surface.

With respect to the second control layer 39, the second electrode 35 and the second alignment layer 34 are both transparent, and the second electrode 35 is placed on the surface of the second transparent substrate 36 to form a flat surface. The second alignment layer 34 is formed on the surface of the second electrode 35 and has a flat surface.

The first control layer 32 and the second control layer 35 are configured to be parallel, and the distance between the first electrode and the second electrode is less than the distance between the first transparent substrate 31 and the second transparent substrate 36. In addition, the TN panel 300 may also include a filing material (not shown) between the first alignment layer 33 and the second alignment layer 34 to ensure that the distance between the first control layer 32 and the second control layer 39 is of a predetermined value.

More particularly, as shown in FIG. 9, the first electrode array includes rows of first electrode leads (horizontal electrode leads) $B_i$ (i is the row number and i=1, 2, 3, . . . ) and columns of first electrode leads (vertical electrode leads) $C_j$ (j is the column number and j=1, 2, 3, . . . ). For illustrative purposes, the pixel display areas are 3×3 pixels and the TN panel is treated as a 3×3 2D pixel matrix, represented by the electrode cells $a_{ij}$ (the display area at row i and column j). Of course, a 1×1, 2×2, or other dimensions of the pixels may also be used. An active switch $D_{ij}$ is associated with and controls the electrode cell aij.

The columns of first electrode leads may overlay the rows of first electrode leads and may also be insulated from the rows of first electrode leads. The active switches (e.g., TFT switches) may be coupled with the electrode cells, the rows of first electrode leads, and the columns of first electrode leads. More particularly, an active switch $D_{ij}$ may be coupled between a electrode cell $a_{ij}$ and a first electrode lead (e.g., vertical electrode lead) supplying a voltage to the electrode cell, and coupled between the electrode cell $a_{ij}$ and another corresponding first electrode lead (e.g., horizontal electrode lead) controlling the ON/OFF state of the active switch $D_{ij}$. That is, the horizontal electrode lead may be used to turn on or turn off the active switch.

When the TFT switch $D_{ij}$ of the $a_{ij}$ is open (i.e., turned off), under the effects of the first alignment layer 33 and the second alignment layer 34, the liquid crystal in the $a_{ij}$ is twisted by 90 degrees. When lights enter TN panel 300 with a polarization direction parallel to the rubbing direction of the entering alignment layer/substrate and pass through $a_{ij}$ the polarization direction of the lights is rotated in 90 degrees when coming out TN panel 300. This state of the liquid crystal in $a_{ij}$ may be referred as the first state.

On the other hand, when the TFT switch $D_{ij}$ of the $a_{ij}$ is closed (i.e., turned on) and the voltage between the electrode cell and the second electrode is greater than a threshold voltage value, the liquid crystal in the $a_{ij}$ is in an electric field formed between the electrode cell and the second electrode, the twisted liquid crystal molecules may re-align the long axis along the direction perpendicular to the direction of the first substrate 31 to second substrate 36. Thus, cell $a_{ij}$ does not change the polarization direction of the incident lights. This state of the liquid crystal in cell $a_{ij}$ may be referred as the second state. Therefore, by controlling the individual TFT switches, the state of the liquid crystal in cell $a_{ij}$ can be individually controlled. That is, the pixel display areas based on the cell $a_{ij}$ can be individually controlled.

Figure 10:
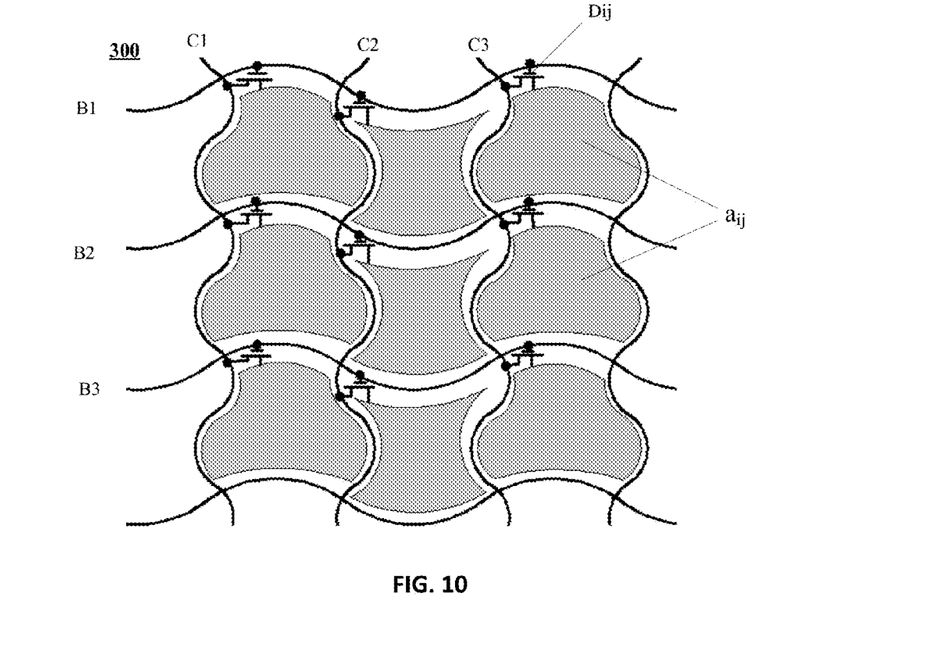
FIG. 10 illustrates another exemplary configuration of a TN panel consistent with the disclosed embodiments.

FIG. 10 shows a top view of another configuration of TN panel 300. As shown in FIG. 10, the first electrode leads and the first electrode cells 38 are in a sinusoid shape. The first electrode array includes rows of first electrode leads (horizontal electrode leads) $B_i$ and columns of first electrode leads (vertical electrode leads) $C_j$. The 3×3 pixel display areas are treated as a 3×3 2D pixel matrix represented by the electrode cell $a_{ij}$. An active switch $D_{ij}$ is associated with and controls the electrode cell $a_{ij}$. Similarly, by controlling the individual TFT switches, the state of the liquid crystal in cell $a_{ij}$, thus the pixel display areas, can be individually controlled.

Figure 11:
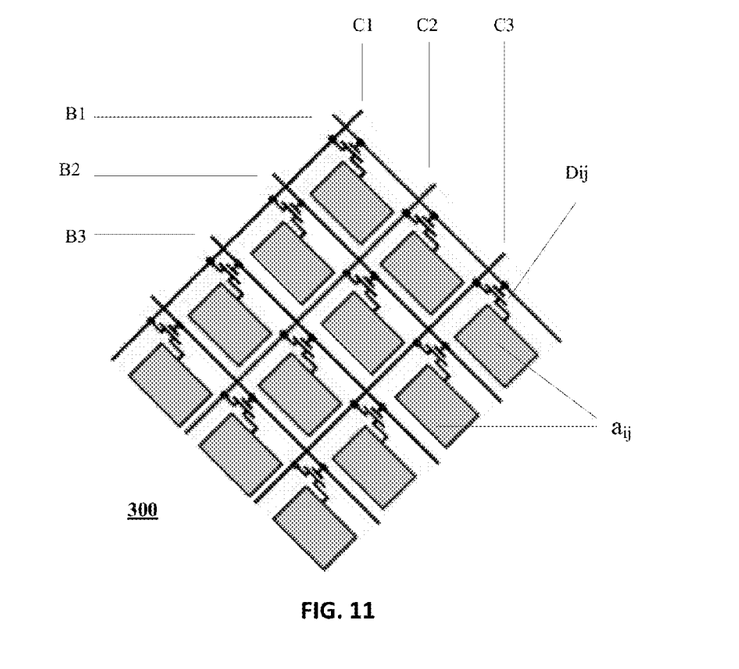
FIG. 11 illustrates another exemplary configuration of a TN panel consistent with the disclosed embodiments.

FIG. 11 shows a top view of another configuration of TN panel 300. As shown in FIG. 11, the first electrode leads are straight lines to form an electrode grid and the first electrode cells 38 are in a diamond shape, or in a square or rectangular shape. The first electrode array includes rows of first electrode leads (horizontal electrode leads) $B_i$ and columns of first electrode leads (vertical electrode leads) $C_j$. The 3×3 pixel display areas are treated as a 3×3 2D pixel matrix represented by the electrode cells $a_{ij}$. An active switch $D_{ij}$ is associated with and controls the electrode cell $a_{ij}$. Similarly, by controlling the individual TFT switches, the state of the liquid crystal in cell $a_{ij}$, thus the pixel display areas, can be individually controlled.

Figure 12:
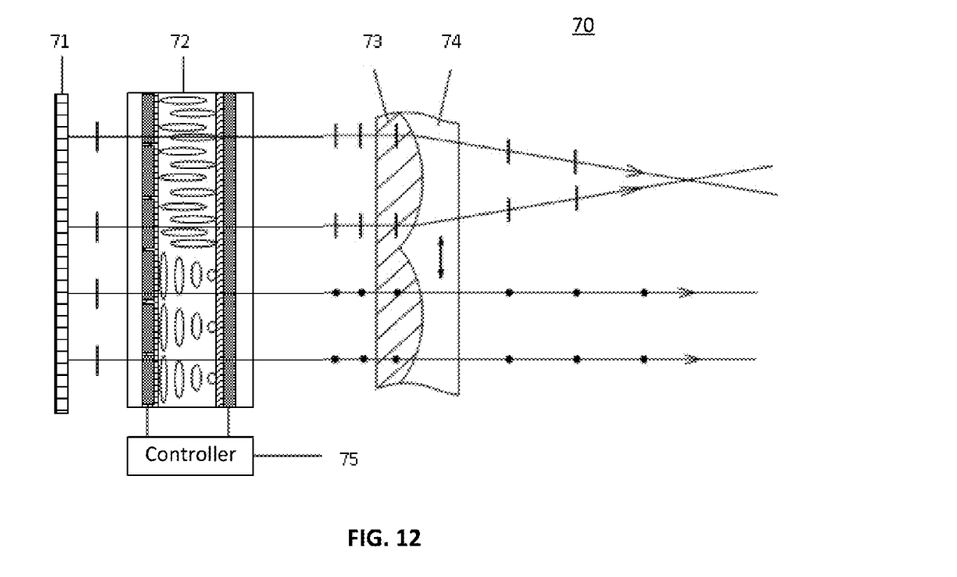
FIG. 12 illustrates another exemplary 3D display system consistent with the disclosed embodiments.

FIG. 12 illustrates a structural diagram of another exemplary 3D display system 70. As shown FIG. 12, 3D display system 70 includes a display device 71, a TN panel 72, a first lens array 73, a second lens array 74, and a controller 75. Other components may be added and certain components may be removed without departing from the principles of the disclosed embodiments.

The display device 71, the first lens array 73, the second lens array 74, and the controller 75 may have similar structures to display device 61, the first lens array 63, the second lens array 64, and the controller 65, respectively, as shown in FIG. 6. Detailed descriptions of these devices are therefore omitted. TN panel 72 may have the same structure as TN panel 300 as shown in FIG. 8.

The display device 71 provides first linearly polarized light, with the polarization direction perpendicular to the light incident or propagation direction. When light emitted from the display device 71 is not linearly polarized, a linear polarizer may be placed between the display device 71 and the TN panel 72 such that the display device 71 provides the first linearly polarized light.

The TN panel 72 may be placed in a specific way such that the light from the display device 71 enters the first control layer 32 first and then propagates to the second control layer 39. Of course, this is used for illustrative purposes and other ways can also be used.

When the first polarized light entering the TN panel 72, the polarization direction of the first polarized light is in parallel to the robbing direction of the alignment layer of the TN panel 72. The controller 75 may control the active switches to either allow the first polarized light pass through the TN panel 72 without changing the polarization direction or to change the first polarized light into second polarized light with a polarization direction perpendicular to the polarization direction of the first polarized light, as previously described.

Further, the first lens array 73 may be a single refractive lens array, and the second lens array 74 may be a birefringent lens array. The first lens array 73 has a single refractive index of $n_1$, and the second lens array 74 has an ordinary refractive index $n_o$ and an extraordinary refractive index $n_e$, while $n_1 = n_0$, and $n_0 > n_e$. Further, the lens optical axis of the second lens array 74 is in the same direction as the polarization direction of the first polarized light, as shown by the double arrow.

It is understood that, although spaces are shown between the display device 71 and the TN panel 72, and between the TN panel 72 and the first lens array 73, the display device 71, the TN panel 72, and/or the first lens array 73 may be placed with one another without space between or with substantially small spaces between them. Also, although the controller 75 as shown connects to the TN panel 72, the controller 75 may be connected to and be able to control individual electrodes in TN panel 72.

In operation, 3D display system 70 may perform pixel-based 2D-3D switching operation. For example, upper two rays of the first polarized light may represent light from pixels displaying a part of a 3D image, while the lower two rays of the first polarized light may represent light from pixels displaying a part of a 2D image.

When the upper two rays enter the TN panel 72, controller 75 controls the TN panel 72 (e.g., the first electrodes, the active switches, etc.) to set the liquid crystal in the pixel display areas corresponding to the upper two rays to the second state, i.e., no change on polarization. For example, the controller 75 may turn on the corresponding active switches. Thus, the upper two rays of the first polarized light pass through the TN panel 72 with change in polarization direction, pass through the first lens array 73, and enter into the second lens array 74.

Because the first polarized light has a polarization direction parallel to the lens optical axis of the birefringent second lens array 74, the refractive index of the second lens array 74 is $n_e$, $n_1 > n_e$. Thus, this difference between the refractive indices, an optical step, makes lights at the interface between the convex surface of first lens array 73 and the concave surface of second lens array 74 converging. The coupled lens arrays thus act as a convex lens and direct the first polarized lights (e.g., lights from a right image and a left image) to a viewer's right eye and left eye, respectively, to realize 3D display.

When the lower two rays enter the TN panel 72, controller 75 controls the TN panel 72 (e.g., the first electrodes, the active switches, etc.) to set the liquid crystal in the pixel display areas corresponding to the lower two rays to the first state, i.e., change on polarization. For example, controller 75 may turn off the corresponding active switches. Thus, the polarization direction of the lower two rays of the first polarized light rotates 90 degrees when pass through the TN panel 72 and become the second polarized light.

The two rays of the second polarized light then pass through the first lens array 73, and enter into the second lens array 74. Because the polarization direction of the second polarized light is now perpendicular to the optical axis of second lens array 74, the second lens array 64 has a refractive index of $n_o$, and $n_1 = n_o$. Thus, no optical step exists at the interface between convex surface of first lens array 73 and the concave surface of second lens array 74. The two rays of the second polarized light therefore go straight through the coupled lens arrays to the viewer's both eyes without separation so as to realize 2D display.

Thus, a pixel-based 2D-3D switching display device can be implemented. The display area can have different sizes, from a single pixel to multiple pixels, and the disclosed system not only can control the single pixel of the display panel, but also multiple pixels of the display panel, so as to individually and independently display 2D and 3D images. The 2D-3D display switching can be done at pixel or multi-pixel level. Other applications, modifications, and advantages are obvious to those skilled in the art.

What is claimed is:

1. A three-dimensional (3D) display apparatus, comprising:
   a display device configured to output polarized lights of one or more images with a first polarization direction;
   a liquid crystal panel coupled to the display device and containing a plurality of pixel display areas to receive the polarized lights from the display device with the first polarization direction, the display areas capable of being individually controlled by corresponding active switches to be in a first state in which the first polarization direction is transformed into a second polarization direction different from the first polarization direction or to be in a second state in which the first polarization direction is maintained; and
   a lens unit coupled to the liquid crystal panel and configured to guide the polarized lights with the second polarization direction to pass through for 2D display and to guide polarized lights with the first polarization direction into predetermined transmitting directions for 3D display.

2. The 3D display apparatus according to claim 1, wherein:
   the plurality of pixel display areas are formed by a plurality of electrode cells, a second electrode, and liquid crystal between the electrode cells and the second electrode; and
   the plurality of electrode cells are coupled to a plurality of first electrode leads arranged in a first direction and a plurality of second electrode leads arranged in a second direction different from the first direction via the corresponding active switches.

3. The 3D display apparatus according to claim 2, wherein: each of the pixel display areas includes one or more pixels.

4. The 3D display apparatus according to claim 3, wherein: the active switches are thin film transistor (TFT) switches.

5. The 3D display apparatus according to claim 4, further comprising:
   a controller coupled to the liquid crystal panel and configured to:
      set a pixel display area determined by a electrode cell in the second state by turning on a TFT switch associated with the electrode cell to apply a first voltage difference between the electrode cell and the second electrode that is greater than a threshold voltage; and
      set the pixel display area in the first state by turning off the TFT switch associated with the electrode cell.

6. The 3D display apparatus according to claim 1, wherein the lens unit further includes:
   a first lens array containing a plurality of single refraction lenses; and
   a second lens array coupled to the first lens array and containing a plurality of double refraction lenses corresponding to the plurality of single refraction lenses.

7. The 3D display apparatus according to claim 6, wherein: an optical axis of the second lens array is parallel to the polarization direction of the first polarized lights.

8. The 3D display apparatus according to claim 6, wherein:
when the first lens array is a convex lens array, the refractive index of the first lens array is equal to a larger one of an ordinary refractive index and an extraordinary refractive index of the second lens array.

9. The 3D display apparatus according to claim 6, wherein:
when the first lens array is a concave lens array, the refractive index of the first lens array is equal to a smaller one of an ordinary refractive index and an extraordinary refractive index of the second lens array.

10. A liquid crystal panel, comprising:
a first control layer including a first substrate, a first electrode lead array, an electrode cell array containing a plurality of electrode cells, a plurality of active switches, and a first alignment layer;
a second control layer including a second substrate, a second electrode, and a second alignment layer; and
a liquid crystal layer arranged between the first control layer and the second control layer,
wherein a plurality of pixel display areas formed based on the plurality of electrode cells to receive polarized lights of one or more images with a first polarization direction and are capable of being individually controlled by the plurality of active switches to be in a first state in which the first polarization direction is transformed into a second polarization direction different from the first polarization direction or to be in a second state in which the first polarization direction is maintained.

11. The liquid crystal panel according to claim 10, wherein:
each of the pixel display areas includes one or more pixels.

12. The liquid crystal panel according to claim 10, wherein:
the first electrode lead array further includes a plurality of rows of first electrode leads, and a plurality of columns of second electrode leads overlaying and insulated from the plurality of rows of first electrode leads; and
the plurality of electrode cells are coupled to the plurality of rows of first electrode leads and the plurality of columns of second electrode leads via the plurality of active switches.

13. The liquid crystal panel according to claim 12, wherein:
the plurality of columns of second electrode leads supplies a voltage to the plurality of electrode cells via the plurality of active switches; and
the plurality of rows of first electrode leads control a ON/OFF state of the plurality of active switches.

14. The liquid crystal panel according to claim 12, wherein:
the plurality of rows of first electrode leads and the plurality of columns of second electrode leads are in one or more shape selected from a sinusoid shape, a curve shape, and a straight line shape.

15. The liquid crystal panel according to claim 12, wherein:
the active switches are thin film transistor (TFT) switches.

16. The liquid crystal panel according to claim 15, wherein:
a pixel display area determined by a electrode cell is configured to be set in the second state by turning on a TFT switch associated with the electrode cell to apply a first voltage difference between the electrode cell and the second electrode that is greater than a threshold voltage; or to be set in the first state by turning off the TFT switch associated with the electrode cell.

17. The liquid crystal panel according to claim 12, wherein:
the plurality of electrode cells are in a diamond shape.

18. The liquid crystal panel according to claim 10, wherein:
the first alignment layer and the second alignment layer are configured to have a predetermined distance by using a sealant.

\* \* \* \* \*